United States Patent
Hauke et al.

(10) Patent No.: US 7,392,939 B2
(45) Date of Patent: Jul. 1, 2008

(54) METHOD AND DEVICE FOR COLLECTING BIOMETRIC DATA

(75) Inventors: Rudolf Hauke, Niederstotzingen (DE); Giuseppe Parziale, Grottaglie (IT)

(73) Assignee: TBS Holding AG, Pfaffikon (CH)

( * ) Notice: Subject to any disclaimer, the term of this patent is extended or adjusted under 35 U.S.C. 154(b) by 235 days.

(21) Appl. No.: 10/538,740

(22) PCT Filed: Feb. 8, 2005

(86) PCT No.: PCT/EP2005/001230

§ 371 (c)(1), (2), (4) Date: Jun. 14, 2005

(87) PCT Pub. No.: WO2006/048049

PCT Pub. Date: May 11, 2006

(65) Prior Publication Data

US 2006/0243803 A1 Nov. 2, 2006

(30) Foreign Application Priority Data

Nov. 5, 2004 (DE) .................. 10 2004 053 900

(51) Int. Cl.
*G06K 5/00* (2006.01)
(52) U.S. Cl. .................. 235/380; 235/382.5
(58) Field of Classification Search .......... 235/380, 235/492, 382, 382.5; 382/127, 115, 210, 382/197, 124; 356/71
See application file for complete search history.

(56) References Cited

U.S. PATENT DOCUMENTS

| | | | |
|---|---|---|---|
| 3,138,059 A | 6/1964 | White | 88/24 |
| 3,882,462 A * | 5/1975 | McMahon | 382/127 |
| 5,177,802 A | 1/1993 | Fujimoto et al. | 382/4 |
| 5,991,431 A | 11/1999 | Borza et al. | 382/127 |
| 6,122,394 A * | 9/2000 | Neukermans et al. | 382/124 |
| 6,636,701 B1 | 10/2003 | Vezard et al. | 396/374 |
| 6,980,286 B1 * | 12/2005 | Feng | 356/71 |
| 7,050,158 B2 * | 5/2006 | Ma et al. | 356/71 |
| 2001/0031075 A1 * | 10/2001 | Fujii | 382/125 |
| 2002/0003892 A1 | 1/2002 | Iwanaga | 382/124 |
| 2003/0021450 A1 * | 1/2003 | Shapiro et al. | 382/124 |
| 2004/0041998 A1 * | 3/2004 | Haddad | 356/71 |
| 2004/0114783 A1 | 6/2004 | Spycher et al. | 382/124 |
| 2004/0119968 A1 * | 6/2004 | Ma et al. | 356/71 |
| 2006/0056661 A1 * | 3/2006 | Einighammer et al. | 382/115 |

FOREIGN PATENT DOCUMENTS

| | | |
|---|---|---|
| DE | 3424955 A1 | 1/1986 |
| DE | 10153808 A1 | 5/2003 |
| DE | 102204003783 | 9/2005 |
| WO | WO99/41631 | 8/1999 |

OTHER PUBLICATIONS

D. Maltoni, Handbook of Fingerprint Recognition, Jun. 2003, pp. 59-74, XP002363594.

* cited by examiner

*Primary Examiner*—Thien Minh Le
(74) *Attorney, Agent, or Firm*—Jacobson Holman PLLC

(57) ABSTRACT

A device for collecting biometric data, in particular fingerprints, the device having an optically active detector for recording the surfaces of body regions. In the beam path between the surface and the detector a mirror is provided.

31 Claims, 2 Drawing Sheets

METHOD AND DEVICE FOR COLLECTING BIOMETRIC DATA

Figure 1:
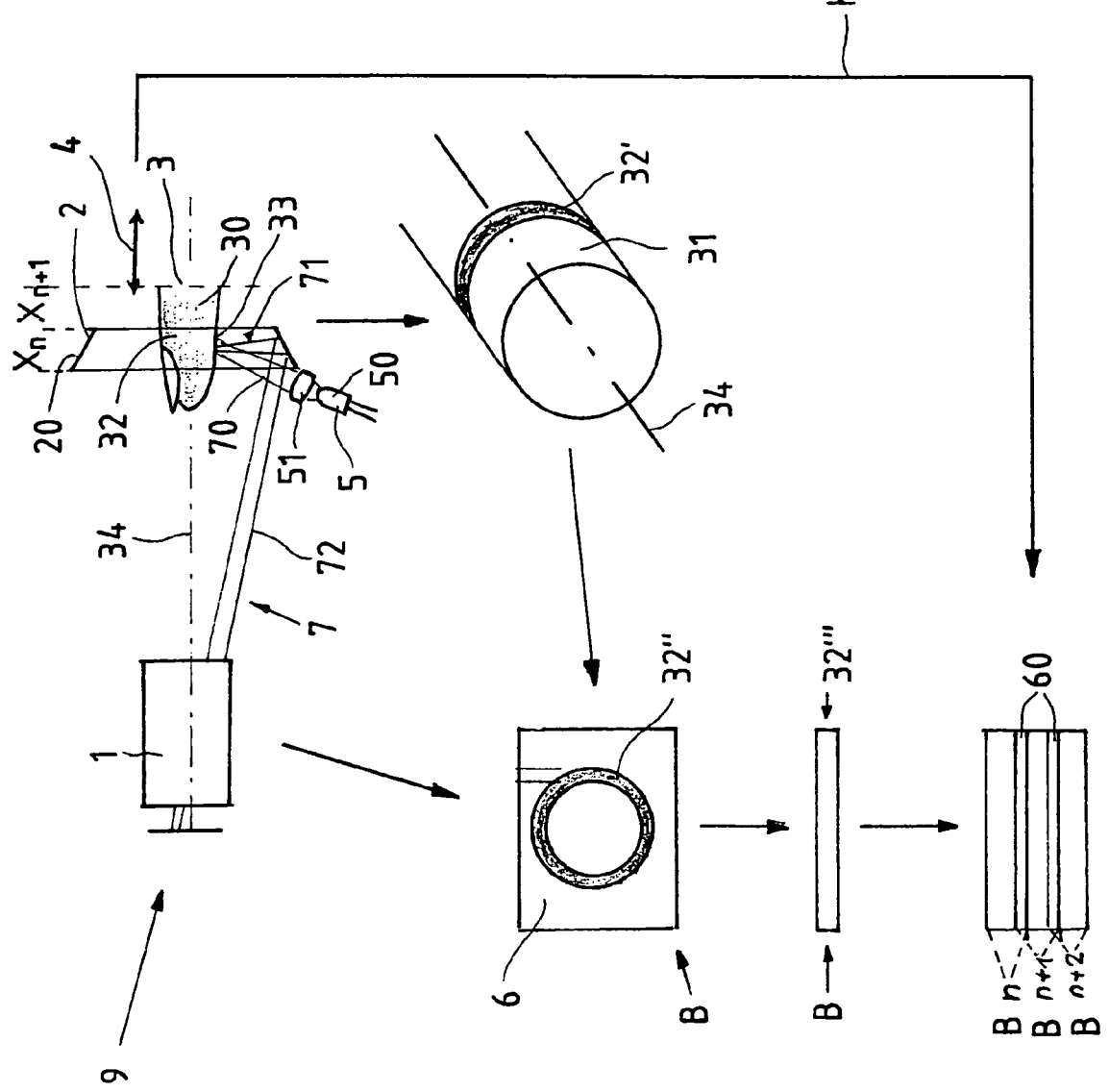

This is a nationalization of PCT/EP05/001230 filed Feb. 8, 2005 and published in German.

The invention refers to a method and a device for collecting biometric data, in particular fingerprints.

In the state of the art devices and methods are known where in particular the device has an optically active detector for recording the surface of body regions.

Known methods use for that purpose a number of detectors, respectively cameras, which record partial regions of the finger profile with different aspect angles. It has to be taken into consideration here that essentially the finger print, that means the finger profile, is collected and described, however, the invention is in no way restricted only to these biometric features, but, if necessary, can be used also for other body parts, for example the palm etc.

According to the state of the art the individual pictures taken by the camera are equalised with methods of image processing, and combined in such a way that the line profile recorded in the transition region blend continuously and true to the original. This results in a complete picture which corresponds with a rolled, flat finger profile.

A disadvantage of the known methods is the fact that a number of cameras have to be used in the circumference, respectively the surface area, of the finger, which then record partial regions of the finger profile. This large number of cameras makes suitable devices uneconomically and expensive. It has also to be taken into consideration that the diametrical arrangement of cameras makes a recording at the same time of biometric data of different body parts, for example, different fingers, impossible as the individual devices needed for the finger cannot be installed in a narrow space. The result is that the recording process itself is comparatively expensive and long. Only the fingers of at least one hand can be collected at one time individually by these known arrangements. However, it takes additional effort in order to make sure that the assigning of the individual fingers of a hand is guaranteed.

Coming from this state of the art it is an object of the invention to find an arrangement which is as space saving as possible.

In order to solve this problem the invention refers to a device for collecting biometric data, as described in the beginning, and proposes that in the beam path between the surface and the detector a mirror is provided.

In the suggestions according to the state of the art a number of detectors are arranged diametrically around the body region. In order to get a reasonable image suitable distances have to be allowed for. This results in a corresponding large space which is required. The use of mirrors in the beam path makes it possible to design the arrangement of detectors spaced apart from the region of the support for the body regions. The detectors may be, for example, put in the back of the device making the construction of devices of this type clearly slimmer and more convenient.

Another advantage of the use of a mirror is the fact that the beam path may be folded by the mirror. This has advantages for the optical image with suitable objectives, respectively lens systems.

However the suggestion also offers the possibility that in a space-saving manner a number of similar devices according to the invention may be arranged one beside the other in order to record different body parts with them. Thus an arrangement is presented which makes it basically possible to collect in one recording step a number of different biometric data of one person. This has certain advantages of speed and safety in data collection.

In the frame of the present invention often abstractly body regions are discussed, and also frequently recording of the fingerprints of a finger is mentioned. In this respect the invention is not restricted to the use for recording the surface shape of a finger, that means a fingerprint, but it can be transferred analogously to all other concerned body regions. With biometric data collection, however, large data banks have been collected with respect to finger prints so that this field of application is accordingly interesting, exactly this field of application also being demanding for the data collection device. The reason is in particular that the finger is approximately a cylinder, and that the finger lines characteristic for a certain person, which form the finger prints altogether, are located at least on a part surface area of this cylinder.

But exactly the otherwise known "rolling" of a finger in order to obtain a finger print is accordingly complex in an optical collection of biometric data, as the surface area is not located in a focal plane and, nevertheless the data collection process should be concluded reliably in a short period of time.

In a preferred development of the invention it has been found to be convenient if the mirror is curved or bent, in particular designed U-shaped or like a half ring. Ideally the curved, respectively bent, or U-shaped, respectively half-ring-like, designed mirror is concentric to the ideal longitudinal axis of the finger. Such an embodiment achieves that the surface of the mirror follows the surface of the body region which has to be recorded, and thus, on the one hand, problems with the sharpness in optical images are reduced clearly, as the region of the depth of definition can be reduced accordingly, and, on the other hand, also the marginal regions of a finger, that are its side surfaces, can be recorded simultaneously as these marginal regions can be imaged by the correspondingly arranged mirrors designed as described above.

Therefore the invention makes it possible to image the finger region decisive for data collection, namely from nail to nail, in an angle segment of roughly 180° (this differs, of course, from person to person). The invention achieves here that for recording the finger profile only one camera is used which collects via the particularly shaped mirror a segment of the circumference of about 180°. It is possible here to form the mirror with a suitable width in order to image, for example, the complete region of the fingertip concerned in one picture on the detector. In addition to this modification according to the invention, however, a modification is suggested where a mirror is used which is correspondingly less wide (for example a few millimetres) which is able to transfer a corresponding segment of the circumference.

In another modification according to the invention it is provided that the mirror is designed as ring mirror. Here the ring mirror embraces the finger, respectively the body region. By means of that an image of the complete circumference of the finger is projected on the detector.

In the preferred modification of the invention it is provided that a conical shape of the mirror is used. The design of the cone achieves that the rays coming from the body region are deviated on the mirror in such a way that they extend, for example, with respect to the longitudinal extension of the body region, for example a finger, with respect to its longitudinal axis, essentially parallel or acute to it. This makes a transmission of this picture to a correspondingly remotely arranged detector possible in a simple manner, and in the beam path may be even an objective provided conveniently.

According to a modification of the invention it is provided to image the complete concerned region of a fingertip with a mirror of suitable width. In another modification according to the invention, however, it is provided to use only a relatively slim mirror what has the result that the partial surface which can be scanned by the mirror is smaller in the relation with the complete surface of the body part which has to be recorded.

As according to the invention a device is striven for which saves space and is therefore constructed small, such an arrangement is convenient as relatively large mirrors are done without. In order to record, nevertheless, the complete concerned surface of the body part, that is for example the region of the fingertip, in another modification according to the invention it is provided to carry out a relative movement between the body region and at least the mirror.

This has the result that the detector records, according to the relative movement, a sequence of many individual picture, each consisting of segments of the circumference, which then are filed into a storage accordingly correlated, and then are equalised with known methods for picture processing, and then are combined to a complete picture. The relative movement here is moved preferably parallel or essentially parallel to the longitudinal extension of the body region which has to be recorded, for example with a finger with reference to the ideal longitudinal axis of the cylindrical finger. The relative movement may be a result of a movement of the finger, or of a movement of the mirror. Both modifications are possible according to the invention.

As it is, according to the invention, provided to arrange the device preferably in a housing it is convenient to arrange an illumination for the body region which has to be scanned.

It has turned out here to be convenient to use a green light source as illumination as the green light source leads to pictures which are correspondingly rich in contrast.

The illumination is cleverly arranged below the body region and provided as closely as possible to the region of the body, that is for example a finger.

For an optimum illumination of the finger in the center of the picture of the detector light incidence is necessary from the direction of the detector. As the available space within the device is restricted, in particular when a complex construction is provided for simultaneously collecting of several body regions/fingers, this will lead to problems with the arrangement of the illumination as the illumination may be visible for a view in any other picture of another detector. For that it is conveniently suggested that a semipermeable mirror designed as partial mirror is used which serves for the introduction of the illumination into the beam path. As it is convenient for space reasons, to deflect the paths of rays anyway advantageously partial mirrors are used here.

In order to realise a sufficient strong illumination LED arrays, preferably stripe-like, that means in a row one above the other or beside the other, preferably with directed radiation, for example through an illumination optic, are used.

It is a considerable advantage if in the beam path between the surface and the detector, in particular between mirror and detector an objective is provided. A segment of the circumference of width B is imaged by a deflecting ring mirror, a mirror as described in the beginning in detail, through the object as circle or circle segment with the width B' on the detector. The width B on the finger surface which can be used at a maximum is limited by the image errors which occur in the optical arrangement. Depending on the necessary local definition on the surface of the body region and depending on the used methods for calculating processing the individual pictures recorded by the detector, a maximum width B of the object for the individual picture exists. Advantageously here the magnification of the objective is determined in such a way that a local element which has to be defined on the body is imaged on an element, a so-called pixel of the detector. The magnification is determined here by the focal distance of the objective used, its image distance and object distance and the shape of the mirror.

Conveniently a telecentric image is provided. As telecentric a course is described which extends parallel to the axis of the main beams of an optical system. Telecentering used in the beam control makes the image editing which tops the detector in particular considerably easier. Eventually this leads to a reduction of measurement errors, respectively image errors, which otherwise, if necessary, should have to be filtered out with large effort during the image post-processing.

In order to achieve a telecentric image a front lens for the objective is required which corresponds at least with the size of the object. In a preferred modification here a rectangular front lens is suggested which comes close in particular to the shape of the object because of its asymmetric design.

In a preferred modification of the invention it is suggested that a relative movement is provided between the body region and at least the mirror. Several variants are possible to carry out this relative movement. First of all it is possible that at least the mirror is stationary during recording and the relative movement is already derived from the movement of the body. Such a design does not require an additional drive. The introducing or removing movement of the body region, for example the finger, in and from the device is simply used. Here cleverly the movement of the finger is guided in such a way that the concerned region of the finger, its bottom surface, is guided over the mirror, and the detector records a sequence of individual pictures, that is a film of the surface structure. The respective pictures here have a corresponding small width, according to the chosen design of the mirror.

However, the relative movement may also be created in another way. It is, for example, convenient that a movement of the mirror, at least during recording the body region, is provided, and otherwise the body region itself is stationary, that means determined in a suitable manner. In this first modification at least only the mirror is moved, that is the optical component which "scans" the surface. Here in a suitable way naturally the complete optical unit is moved, as it is described in the following modification of the invention. It is suggested here that detector, mirror, and, if necessary, the objective are combined to a sensor head, and the sensor head can move, in particular move linear. Thus in the sensor head the optical parameters can be set once and remain defined. If, for example, the position of the mirror changes with respect to the detector, its objective or a separate objective, the picture had to be focused again by means of suitable correction lenses or post-corrections. Such a design is basically also possible in the sense of the invention, however, correspondingly more expensive.

Cleverly the suggested sensor head is moved, for example, for recording the surface feature, roughly concentric over the finger surface and parallel to the finger surface which is an idealised cylinder surface area. Here cylinder stripes, respectively cylinder segments are imaged one after the other on the detector using a half ring mirror with a suitable local definition.

The problem according to the invention is furthermore solved by a collection arrangement which serves for simultaneously collecting biometric data of different body regions, the collection arrangement being equipped with at least two devices for collecting biometric data, and the device having at least one optically active detector for recording the surface of body regions. Here a first device is provided for recording a first body region, and a second device for recording a second body region, and the collection arrangement has a spreading device-which spreads the body regions in such a way that even lateral recordings of the body regions are possible by the detector. Interesting for collecting biometric data are in particular fingerprints, as already described.

The suggested collection arrangement according to the invention uses, among others, here also the device according to the invention described above for collecting biometric data. However, the invention is not restricted to it, the arrangement may also interact, if necessary, with devices designed in another way. The essential advantage of this embodiment of the collection arrangement is the fact that it is possible to record by the detector also lateral pictures of the body region, these are, for example, the lateral surfaces of the fingers.

In particular the embodiment of the device suggested in the beginning with a mirror shaped for example U-like or half-ring-like makes it possible to image these lateral surfaces almost as a nail-to-nail picture on the detector. The embodiment is here altogether even very space-saving as for each individual finger only one detector, respectively one camera, has to be used, so that such an arrangement can be realised accordingly space-saving. Without any problems here several devices could be realised one beside the other, for example in order to collect in one collection process two body regions, for example two fingers or even all fingers of a hand, including the thumb.

Here the collection arrangement suggested according to the invention also implements at the same time an exact assignment of the respective recorded pictures. If, for example, the collection device is designed in such a way that all fingers of one hand can be collected, that is scanned, respectively recorded, then also the position of the hand is determined. The manufacturing of a control print which makes possible exactly the assignment of the pictures taken from the individual fingers with regard to the complete hand, is not necessary. The required time for collecting the biometric data is reduced, and simultaneously the data security is increased, and even the necessary data processing is reduced at the same time as the control print does not have to be compared with the single takings of the fingers.

The spreading effect does not only have the advantage that the lateral regions of the fingers which have to be recorded can be imaged, the spreading has also the effect that the detectors which are, as a rule, at a small distance to the tips of the fingers have a corresponding larger distance from each other. As also the beam paths of the individually recorded fingers are orientated with a suitable spreading angle, the detectors are spaced from each other according to the radiation rules.

In a modification of the invention it is suggested here that the hand has to be put with straight fingers on the arrangement for recording in such a way that all fingers are in one plane, however, between the fingers a sufficient distance remains in order to make a lateral image of the single fingers possible. This is achieved by a spreading device which spreads the fingers of a hand in a defined, naturally comfortable way. By means of spreading, regions of the fingers are visible which otherwise are concealed by the side faces of the fingers, and thus are available for the recording procedure.

In a modification according to the invention it is provided that the spreading device is designed as stoppers, in particular cylindrical stoppers, which have to be arranged between the body regions, in particular between the fingers of a hand, and the mirror device is located below the body regions, for example the fingers. The arrangement has to be seen here in such a way that the mirror is arranged in such a way below the device that the mirrors face the finger surface, respectively the palm. Here the hand is placed on or in the collection arrangement in such a way that one cylinder each is located between two fingers. Of course, it is possible to realise a glove-like design making it possible to guide the fingers of a hand even more exactly. Different hand sizes can be taken into account by different sizes of the arrangement in the same as with gloves.

Conveniently it is striven for that the spreading device effects a spreading of the fingers of a hand inserted into its collection arrangement of 10° to 20° each, preferably about 15° between two adjacent fingers. It has been found that such an angle distance is sufficient in order to image in particular the finger tip region in a satisfying quality in a circumference region of about 180°, preferably in particular from nail to nail.

In another modification according to the invention it is also provided to use for example the housing of a ring mirror as part of the spreading device.

It is, in the sense of the invention, equivalent whether the fingers of a hand are inserted into the collection device according to the invention or whether they are put on it accordingly.

In another preferred embodiment of the invention it is provided that the collection arrangement has a support surface in which slots or openings with optically transparent covers are provided, and the mirrors each are arranged in the region of the slot, respectively the indentation. The imaging of the body regions, in particular of the fingers, is supposed to be carried out touch-less. As the space between the fingers is very narrow, the recording installations cannot be provided in this region. In order to prevent the sensitive optic from being contaminated a suitable distance has to be provided.

This means that suitable measurements have to be taken, so that, on the one hand, a secure positioning of the mirror around the body region which has to be recorded is possible, and, on the other hand, contamination is prevented reliably. For that purpose it is convenient that the collection arrangement has a support surface in which slots or openings are provided with optically transparent covers, and the mirrors each are arranged in the region of the slot, respectively the indentation. The optically transparent covers can easily be cleaned in a simple manner, and they are suitably transparent for the used light rays. By means of a simple distancing, as it is, for example, possible with the arrangement of a slot, the same may be accomplished.

In another preferred embodiment of the invention it is provided that the support surface forms grooves for receiving fingers, respectively the palm, and the arrangement of the grooves effect a spreading. In order to increase the operability of the collection arrangement it is convenient to imbed the recorded hand in such a way that it is guided optimally. This is conveniently achieved by a suitable groove-like design of the support surface. Similar to the negative print of a hand the support surface has a corresponding design which additionally also may act as spreading device as, by means of that, also a corresponding guide of the finger is possible. Here this groove-like design of the support surface may effect a spreading on its own, or it may be provided additionally to other spreading devices.

In another preferred modification of the invention it is provided that two devices share one objective. Advantageously these are two adjacent devices. As the available space in the collection arrangement according to the invention is very narrow—all fingers, including the thumbs, of both hands of a person are supposed to be collected with one device—such a suggestion leads to a corresponding saving of space as the number of the required objectives, which actually also need accordingly space, may be reduced. It is, for example, provided to use a double objective which may be used for two or even more detectors. They will then be focused individually.

It is convenient that for each finger its own movable sensor head is provided, and adjacent sensor heads each are movable in opposite directions. In a modification of the invention it has already been described that it is convenient that the detector is located with reference to the axis defined by the longitudinal extension of the body in front of the body region. Transferred to the use on a finger this means that the (idealised) longitudinal axis of the cylindrical finger carries the detector in its prolongation to the front facing away from the hand. In order to adjust the optic once it is convenient to integrate all optical elements, that means the mirror, the objective and the detector in one sensor head, as for scanning the complete surface of a finger a relative movement is decisive, this will be performed by the sensor head altogether. If all sensor heads are located, orientated in the same direction, in front of the respective fingers, even with a suitable spreading of the fingers there might arise a problem of space. It is then convenient to chose for one or the other sensor head a reversed arrangement in such a way that the detector is not located in front of the finger, but, for example, in the region below the palm. This may be realised by a simple re-construction, respectively a mirror which is orientated in another way, in a simple manner. Thus also the region below the palm may be used for the arrangement of sensor heads.

In a preferred modification of the invention for each finger an individual movable sensor head is provided, and each sensor head can move in longitudinal direction, in particular in the direction of the longitudinal extension of the respective finger. It is already sufficient here that a mirror which embraces the circumference line of the body region, respectively the finger, is moved in the axial direction of the cylinder-like finger. In the sense of the invention, however, it is also possible, and this goes also for the device used in the collection arrangement to the same extent, that the mirror images a surface area line parallel to the longitudinal axis, and, by the way, the mirror, respectively the sensor head (depending on the design) follows the surface area on a radial path. This is also an object of the invention.

In particular, when a movement of the sensor head or the mirror is provided as relative movement, it is favourable to provide a locking arrangement of the hand and/or the individual fingers on or in the collection device. By means of that it is possible to position the body regions which have to be recorded exactly and to get an image as sharp as possible.

The problem according to the invention is also solved by a method for collecting biometric data with the features described in the following. In the methods known according to the state of the art the single pictures taken by a number of cameras/detectors are combined in the picture processing accordingly to a complete picture. Here, as a rule, simultaneously pictures are taken by several cameras, respectively detectors, from different angles to the body region. Here an exact splitting of the angle segment recognised by the respective detector is decisive in order to get an exact picture, in particular in the edge region, that is in the contact region of the individual pictures, which is, if necessary, collected by the first or the second detector. The geometric conditions therefore are accordingly complicated and therefore also prone to errors. Even the taking of a series of pictures simultaneously with a number of detectors may not be a secure procedure in order to get a complete image of the idealised cylindrical surface area of a finger.

It is once again more pointed out here that not only the recording of fingerprints is the aim but that the method according to the invention as well as the device according to the invention can be used in the same way for each body region. In particular the invention contributes to the technical image collection of non-planar body regions, like the finger, reliably.

Referring to the described problems in the state of the art in picture processing now according to the invention it is suggested that a detector records at least one picture of a first partial surface of the surface of the body region which has to be collected, after that a relative movement between the detector and the body region is carried out, after that the detector takes at least one picture of a second partial surface of the surface of the body region which has to be collected.

It is like taking a film across the surface of the region of the body by the detector. This film comprises a high number of individual pictures, for example in axial direction of a finger. Of course, the frequency of picture recording is chosen such that at least one picture is recorded from the surface per minimum width of the mirror (which might be smaller than the actual physical width of the mirror). However, this is not a regular problem with modern high performance cameras, respectively detectors. In particular thus a number of pictures are available which overlap each other which provide an image editing without any problems.

Here conveniently such a large number of redundant or essentially redundant pictures is produced so that, for example, even error calculations in the picture processing, respectively correlation calculations, are possible for optimising the image.

The method according to the invention extents first of all to the fact that the detector carries out a relative movement with regard to the surface of the body region which has to be recorded. However, in the same way the problem mentioned at the beginning is solved by a method for collecting biometric data, where a sensor head comprising a detector and an imaging optic records at least one picture of a first partial surface of the surface of the body region which has to be recorded, after that a relative movement is carried out between the body region and the sensor head, respectively parts of the sensor head, and after that the sensor head records at least one picture of a second partial surface of the surface of the body region which has to be recorded.

In the top region of this application it is, in particular, described that a mirror, in a preferred modification a half ring mirror or a ring mirror carries out a relative movement with regard to the surface of the body region. According to a modification of the invention it is not decisive that also the detector moves together with the mirror, respectively the optic, the optical conditions of which remain therefore during the recording unchanged. This may also be solved in another way in the sense the invention. Therefore the invention also comprises a solution where a sensor head comprising a detector and an imaging optic or even only parts of the sensor head, that is, for example only the mirror, carries out a relative movement.

The advantages described above of such a procedure are also contained in this method according to the invention.

Conveniently the relative movement is parallel or essentially parallel to the longitudinal extension of the body region. As already described in connection with the device the relative movement may be derived either from the movement of the body region, that is the finger or the hand, or from the movement of the optical elements (detector, sensor head and so on).

In this connection it is in particular pointed out that all features and characteristics, but also procedures, described with reference to the device can be transferred accordingly even with reference to the formulation of the method according to the invention, and can be used in the sense of the invention, and are seen as disclosed as well. The same goes vice versa, that means, construction, that is device, features only mentioned with regard to the method may also be taken into consideration and claimed in the frame of the device claims, and also count as part of the invention and disclosure.

The method according to the invention aims at producing a number of pictures where it is, according to the invention, provided that the detector correlates the pictures recorded from the partial surfaces, and files them in their sequence in storage. This correlation is important in particular for the image which has to be produced of the complete recorded surface.

It is an advantage for the subsequent picture processing that at least the pictures of the first and second partial surfaces overlap. Between the recording of the first and the second partial surface a relative movement occurs. Thus another region of the surface is imaged. In order to create an image without interruptions out of these individual pictures it is convenient to provide a corresponding overlap region through which in particular the exact connection of the individual partial pictures to each other, but also reference points for equalising, respectively error calculation and so on, may be derived.

With reference to the method according to the invention it is convenient that in the beam path between the body region and the detector a mirror, which is sectional curved, respectively bent, is provided, if necessary as part of the imaging optic, and the detector records a picture of the curved partial surface. The result of this suggestion according to the invention is that images are projected ring-like or U-like bent to the detector. In this respect, of course, the design of the detector has to focus on that, and in particular the finishing may be optimised in this respect as, first of all, always only in a certain region known because of the imaging optic an image may occur. By such a consideration in the design of the device in the method the picture processing has to accelerate accordingly.

The method according to the invention also includes a picture-processing module which combines the pictures filed in the storage to a three-dimensional image of the recorded surfaces. This is done with known methods of picture processing. This picture processing, however, reaches, for example, the production of an image of the surface area of a finger, for example of a three-dimensional image. In another step it is possible then to obtain a "rolled-off", planar image out of these picture information. By means of the a data set of biometric data is created which may be compared, for example, with already existing finger prints, produced by ink, and may also be collected as data.

In this connection the picture-processing module produces, if necessary, even an equalising of the image, which is designed as complete picture, and/or of the respective single pictures taken from the partial surfaces.

Figure 2:
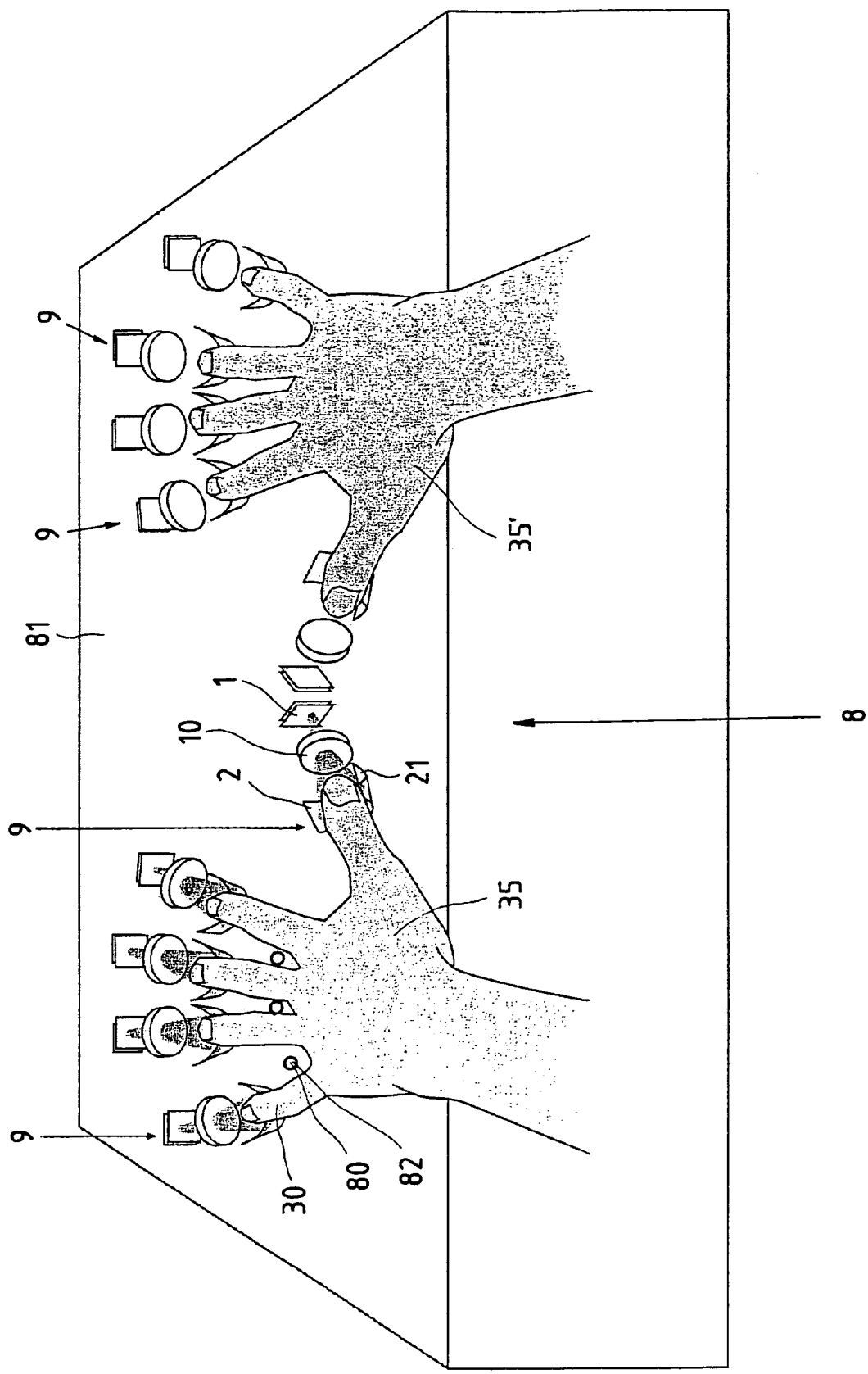

In the drawing the invention is shown schematically. In the pictures:

FIG. 1 a schematic overlook of the method according to the invention, including the device according to the invention and FIG. 2 a schematic view of the collection arrangement according to the invention.

In FIG. 1 the way of operation of the device according to the invention and the method according to the invention is shown schematically.

Object of the invention is a device for collecting biometric data, for example finger prints, the device having an optically active detector 1 for recording surfaces of body regions 3, for example a finger 30. An essential part of the invention is the fact that in the beam path 7 between the surface 33 and the detector 1 a mirror 2 is provided. In the example shown here the mirror 2 has a defined width. It is designed ring-like, thus embraces the finger 30, respectively the body region 3, completely. It has a conical shape so that the beam path 7 results as indicated.

Reference number 5 indicates an illumination. It consists in this embodiment of one or several LEDs 50 the emitted light of which is focused by an illumination optic 51 to the surface 33 which has to be recorded. The beam path from the illumination to the surface which has to be recorded is referred to by 70.

The light reflected by the surface 33 is imaged in a first beam path 71 by the ring mirror 20 because of its cone-like shape to the front, with reference to the longitudinal extension of the body region 3 to the detector located in front of the body region 3 along the beam path 72.

The finger 30 which has to be recorded in this embodiment can be idealised and simplified as cylinder 31. The cylinder 31 has here a longitudinal axis 34 which is includes as aid in the top region of FIG. 1. The detector 1 is located with reference to that on the prolongation of the longitudinal axis 34 in front of the finger.

In the schematic drawing shown here the special imaging optic, the objective which is required for detector 1, is not shown in detail. It is, for example, integrated in detector 1 and not indicated separately.

Because of the width of the mirror 2 a circumference segment 32 of the surface 33 is projected to the detector 1. This is done in a first position X.

Below the drawing of the finger in the ring mirror 20 the idealised cylinder 31 is indicated; 32' indicates the cylindrical surface area. Because of the conical shape of mirror 2 a ring-like picture 32" is created in the detector by this circumference segment 32'. This picture is indicated by reference number 6, and is located on the left hand side besides the idealised cylinder 31. In picture 6 which is, for example, the picture recording level of detector 1, the cylindrical surface area 32, 32' is projected into a ring-like structure 32".

It is important that, with reference to the relative position X from mirror 2 to the body region 3, clearly a picture B can be assigned. Here not the precise measuring is decisive, but it is sufficient to state this correlation.

The image 32" shown in picture 6 as ring contains eventually information about the three dimensional design of the recorded surface 33.

Ideally this information is stored, for example, planar, as it is indicated for example in the next processing step, and indicated by reference number 32'''. However, this is only a means for supporting the drawing, of course the three-dimensional data are also stored, administered and calculated three-dimensionally.

According to the method of the invention a first picture $B_n$ is created from a first position $X_n$, and filed by the detector in storage.

Then a relative movement 4 is carried out, preferably parallel or essentially parallel to the longitudinal extension, respectively longitudinal axis 34, of the body region 3, respectively the finger 30.

At the spot $X_{n+1}$ a second partial picture $B_{n+1}$ is recorded, and loaded also by the detector into the storage to another storage space. The recording speed and the width of the mirror are here adapted to each other in such a way that there is an overlapping region 60 of the single pictures, in order to line up the respective single pictures Bn, $B_{n+1}$, $B_{n+2}$ and so on accordingly. Because of the known width of the mirror and the imaging relations by means of that also a scaled, that is correct scale, image is created which can be taken into consideration for calculation accordingly. Arrow K is the correlation between the relative movement 4, which leads to the different positions $X_n$, respectively $X_{n+1}$ and so on, on the one hand, and secures the reference to the respective pictures $B_n$, $B_{n+1}$ and so on, on the other hand.

In the following picture processing module again a complete picture, in particular a three dimensional image of the recorded surface 33, is created and provided from the single pictures $B_i$.

In FIG. 2 the collection arrangement 8 according to the invention is shown schematically. The essential advantage of this collection arrangement 8 according to the invention is the fact, that the support surface 81 can support all fingers 30 of both hands 35, 35', and for each finger, including the thumbs, a device 9, according to FIG. 1, is provided. For simplicity's sake the device 9 is shaped each time by the mirror 2, 20, the objective 10 and the detector 1, the exact construction corresponds, for example, with the arrangement shown in FIG. 1 in the top region.

The essential advantage of this invention is in particular the fact that an arrangement of the devices 9 is possible which is very space saving, making a simultaneous recording of all fingers of the hands of a person possible. This results in a considerable acceleration of the procedure for collecting biometric data.

As the mirror 2 in the example detailed in FIG. 2 is shaped like a U, a picture recording from nail to nail is achieved which is sufficient, as a rule, for data collection. In order to reach in particular the side region, that is the finger region up to the nail, it is convenient to provide a spreading device 80. This is formed, for example, by cylindrical stoppers 82 which are positioned between the fingers in the region of the carpal bone when the hand touches or is inserted in or at the collection arrangement 8.

The claims filed with the application now and to be filed later on are attempted formulations without prejudice for obtaining a broader protection.

If here, on closer examination, in particular also of the relevant prior art, it turns out that one or the other feature may be convenient for the am of the invention, however, not decisively important, of course, already now a formulation is striven for which does not contain anymore such a feature, in particular in the main claim.

References in the sub-claims relate to the further design of the matter of the main claim through the characteristics of the respective sub-claim. These are, however, not to be understood as a waiver of independent protection of the matter for the characteristics of the referred sub-claims.

Characteristics only disclosed in the description so far may now, in the course of proceedings, be claimed as being of inventive relevance, for example to distinguish from the state of the art.

Characteristics only disclosed in the description or even single characteristics from claims which comprise a variety of characteristics may be used at any time to distinguish from the state of the art in the first claim, and this is even if such characteristics have been mentioned in connection with other characteristics, respectively achieve particularly convenient results in connection with other characteristics.

The invention claimed is:

1. A device for collecting biometric data, the device comprising
    an optically active detector for recording a surface of a body area,
    a light source for producing a beam path of light,
    a mirror located in the beam path between the surface of the body area and the detector, the mirror being a conical ring-shaped mirror for data collection of approximately 180°.

2. The device according to claim 1, wherein the mirror is either curved or bent in a U or a half-ring.

3. The device according to claim 1, wherein a partial surface of the surface scanned by the mirror is small in relation to a complete surface of the body area to be recorded.

4. The device according to claim 3 wherein a path of rays between the mirror and the detector is either parallel to or acute with respect to a longitudinal extension of the body area to be recorded.

5. The device according to claim 1, wherein the light source is a green light source.

6. The device according to claim 5 wherein the light source is arranged below the body area.

7. The device according to claim 6 wherein the light source is stripe-like, as an LED array.

8. The device according to claim 1, wherein the mirror is a semipermeable mirror designed as a partial mirror for introducing the light into the beam path.

9. The device according to claim 1, wherein in the beam path between the mirror and the detector, an objective is provided.

10. The device according to claim 9, wherein a magnification of the objective is chosen so that a local element on the surface of the body area is imaged at least on one (pixel) of the detector.

11. The device according to claim 9, wherein a front lens of the objective corresponds at least to a size of the body area.

12. The device according to claim 11, wherein the front lens is a rectangular front lens.

13. The device according to claim 9, wherein the detector and the mirror as well as, the objective are combined as a sensor head, and the sensor head is moved linearly.

14. The device according to claim 1, further comprising a telecentric imaging of the body area.

15. The device according to claim 1, wherein the mirror is movable with respect to the body area.

16. The device according to claim 15, wherein the mirror is movable essentially parallel to a longitudinal extension of the body area to be recorded.

17. A collection arrangement for collecting biometric data, the collection arrangement comprising
    at least one optically active detector for recording a surface of a body area,
    a light source for producing a beam path of light,
    a mirror located in the beam path between the surface of the body area and the detector,
    the at least one detector including a first device for recording a first body region and a second device for recording a second body region, and
    a spreading device for spreading apart body areas in such a way that lateral recordings of the body areas are possible by the at least one detector.

18. A The collection arrangement according to claim 17, wherein the spreading device is cylindrical stoppers, arranged between fingers of a hand; and mirrors are located below the fingers.

19. The collection arrangement according to claim 18 wherein the spreading device effects a spreading of the fingers about 15°, between two adjacent fingers.

20. The collection device according to claim 17, further comprising a supporting surface in which slots or openings with optically transparent covers are provided, and the mirrors are each arranged in a region of the slot in an indentation.

21. The collection arrangement according to claim 20, wherein the supporting surface forms grooves for receiving fingers and an arrangement of the grooves effect the spreading device.

22. The collection arrangement according to claim 17, wherein two adjacent devices share an objective.

23. The collection arrangement according to claim 17, wherein for each finger an individual, movable sensor head is provided, and adjacent sensor heads move in an opposite direction with respect to each other.

24. The collection arrangement according to claim 17, wherein for each finger an individual, movable sensor head is provided, and each sensor head is movable longitudinally, in a direction of a longitudinal extension of the respective finger.

25. The collection arrangement according to claim 17, further comprising a locking arrangement of individual fingers by the spreading device.

26. A method for collecting biometric data, said method comprising introducing a bent mirror in a light beam path between a surface of a body region and a detector, recording at least one picture of a first cylinder-shaped partial surface of the surface of the body region by the detector relatively moving the detector and the body region, and recording at least one picture of a second cylinder-shaped partial surface of the surface of the body region.

27. The method according to claim 26, wherein the relative movement is carried out either parallel or essentially parallel to a longitudinal extension of the body region.

28. The method according to claim 26, wherein the detector files the picture recorded from the partial surfaces correlated in their order in a storage.

29. The method according to claim 28, wherein the picture of the first and the second partial surface overlap at least partly.

30. The method according to claim 28, wherein in a picture processing module the pictures filed in the storage are combined to a three-dimensional image of the recorded surfaces.

31. The method according to claim 30, wherein the picture processing module equalises at least one of the three-dimensional image and the pictures.

* * * * *